(12) United States Patent
Mittal et al.

(10) Patent No.: US 9,870,511 B2
(45) Date of Patent: Jan. 16, 2018

(54) METHOD AND APPARATUS FOR PROVIDING IMAGE CLASSIFICATION BASED ON OPACITY

(71) Applicant: HERE Global B.V., Veldhoven (NL)

(72) Inventors: Anish Mittal, Berkeley, CA (US); William Marks, San Francisco, CA (US)

(73) Assignee: HERE Global B.V., Veldhoven (NL)

( * ) Notice: Subject to any disclaimer, the term of this patent is extended or adjusted under 35 U.S.C. 154(b) by 134 days.

(21) Appl. No.: 14/883,274

(22) Filed: Oct. 14, 2015

(65) Prior Publication Data

US 2017/0109612 A1    Apr. 20, 2017

(51) Int. Cl.
*G06K 9/62*    (2006.01)
*G06K 9/00*    (2006.01)

(52) U.S. Cl.
CPC ................. *G06K 9/00791* (2013.01)

(58) Field of Classification Search
CPC ........... G06T 5/002; G06T 2207/30232; G06T 5/003; G06T 7/254
USPC ....... 382/165, 170, 171, 190, 209, 224, 264, 382/274, 275; 358/3.26, 3.27, 537
See application file for complete search history.

(56) References Cited

U.S. PATENT DOCUMENTS

| | | | |
|---|---|---|---|
| 6,972,787 B1 * | 12/2005 | Allen ...................... | H04N 7/181 348/162 |
| 7,256,801 B2 * | 8/2007 | Baar ...................... | G06F 3/0481 345/428 |
| 7,280,696 B2 * | 10/2007 | Zakrzewski ....... | G06K 9/00771 382/218 |

(Continued)

FOREIGN PATENT DOCUMENTS

| | | |
|---|---|---|
| CN | 101819286 A | 9/2010 |
| CN | 104318545 A | 1/2015 |

OTHER PUBLICATIONS

Choi et al., "Referenceless Perceptual Fog Density Prediction Model", Human Vision and Electronic Imaging XIX, Feb. 25, 2014, vol. 9014, retrieved on Oct. 16, 2015 from http://live.ece.utexas.edu/publications/2014/LarkKwonChoi_SPIE_HVEI_2014_Referenceless_perceptual_fog_density_prediction_model.pdf, pp. 1-12.

Pavlic et al., "Image based fog detection in vehicles", IEEE Intelligent Vehicles Symposium (IV), Jun. 3-7, 2012, retrieved on Oct. 16, 2015 from http://mediatum.ub.tum.de/doc/1137870/302563.pdf, pp. 1-6.

(Continued)

*Primary Examiner* — Yosef Kassa
(74) *Attorney, Agent, or Firm* — Ditthavong & Steiner, P.C.

(57) ABSTRACT

An approach is provided for automated classification of an image based on the fogging attributes associated with the image. The approach involves processing and/or facilitating a processing of image data associated with at least one image to cause, at least in part, an extraction of one or more fogging attributes from the image data. The approach also involves causing, at least in part, a mapping of the one or more fogging attributes to one or more features of at least one classifier, wherein the at least one classifier is trained based, at least in part, on a co-registration of the one or more features to one or more records of previously made image judgements. The approach further involves causing, at least in part, a classification of the at least one image as either in a fogging-afflicted state or a non-fogging-afflicted state based, at least in part, on the at least one classifier.

20 Claims, 13 Drawing Sheets

(56) References Cited

U.S. PATENT DOCUMENTS

| | | | |
|---|---|---|---|
| 7,302,101 B2* | 11/2007 | Zakrzewski | G06K 9/00771 382/218 |
| 7,505,604 B2* | 3/2009 | Zakrzewski | B64D 45/0015 382/100 |
| 7,729,510 B2* | 6/2010 | Zakrzewski | B64D 45/0015 340/630 |
| 7,873,235 B2* | 1/2011 | Steiger | G06T 5/30 345/469.1 |
| 8,238,688 B2* | 8/2012 | Chen | G09G 3/2007 382/274 |
| 8,400,502 B2* | 3/2013 | Zakrzewski | B64D 45/0015 348/122 |
| 8,837,857 B2* | 9/2014 | Hartley | G06T 5/003 348/207.1 |
| 2009/0067714 A1 | 3/2009 | Yen et al. | |
| 2014/0247968 A1 | 9/2014 | Pavlic | |

OTHER PUBLICATIONS

Bronte et al., "Fog Detection System Based on Computer Vision Techniques", 12th International IEEE Conference on Intelligent Transportation Systems, Oct. 4-7, 2009, retrieved on Oct. 16, 2015 from http://www.robesafe.es/personal/bergasa/papers/ITSC_Bronte_2009.pdf, pp. 1-6.

Gu et al., "Removing Image Artifacts Due to Dirty Camera Lenses and Thin Occluders", ACM Transactions on Graphics, Dec. 2009, vol. 28, Issue 5, retrieved on Oct. 16, 2015 from https://cseweb.ucsd.edu~ravir/dirtylens.pdf, pp. 1-10.

He et al., "Single Image Haze Removal Using Dark Channel Prior", IEEE Transactions on Pattern Analysis and Machine Intelligence, Dec. 2011, vol. 33, Issue 12, retrieved on Oct. 16, 2015 http://research.microsoft.com/en-us/um/people/jiansun/papers/Dehaze_CVPR2009.pdf, pp. 1-8.

* cited by examiner

START → DETERMINE COLOR-BASED LOCALIZED CONTRAST FEATURES BASED ON A MICHELSON CONTRAST VALUE — 501

→ DETERMINE THAT THE COLOR-BASED LOCALIZED CONTRAST FEATURES ARE ASSOCIATED WITH THE FOGGING-AFFLICTED STATE IF THE MICHELSON CONTRAST VALUE IS BELOW A THRESHOLD VALUE — 503

→ DETERMINE THAT THE COLOR-BASED LOCALIZED CONTRAST FEATURES ARE ASSOCIATED WITH THE NON-FOGGING-AFFLICTED STATE IF THE MICHELSON CONTRAST VALUE IS ABOVE A THRESHOLD VALUE — 505

→ DETERMINE THE MICHELSON CONTRAST VALUE FOR A PIXEL OF THE IMAGE BASED ON INTENSITY INFORMATION ASSOCIATED WITH NEIGHBORING PIXELS — 507

→ END

METHOD AND APPARATUS FOR PROVIDING IMAGE CLASSIFICATION BASED ON OPACITY

BACKGROUND

Service providers and device manufacturers (e.g., wireless, cellular, etc.) are continually challenged to deliver value and convenience to consumers by, for example, offering high quality images to user devices (e.g., mobile phones, tablets, laptop computers, etc.) and/or embedded systems (e.g., navigation systems) in vehicles for providing a variety of services to users (e.g., mapping services). However, due to time and human resource constraints, only a small portion of the voluminous number of images may be examined, leaving large gaps in analysis that may allow poor quality images to be provided for use in different applications. As a result, service providers face significant technical challenges in providing efficient analysis and classification of images based on their opacity attributes.

SOME EXAMPLE EMBODIMENTS

Therefore, there is a need for an approach for automated classification of an image based on the fogging attributes associated with the image.

According to one embodiment, a method comprises processing and/or facilitating a processing of image data associated with at least one image to cause, at least in part, an extraction of one or more fogging attributes from the image data. The method also comprises causing, at least in part, a mapping of the one or more fogging attributes to one or more features of at least one classifier, wherein the at least one classifier is trained based, at least in part, on a co-registration of the one or more features to one or more records of previously made image judgements. The method further comprises causing, at least in part, a classification of the at least one image as either in a fogging-afflicted state or a non-fogging-afflicted state based, at least in part, on the at least one classifier.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of image data associated with at least one image to cause, at least in part, an extraction of one or more fogging attributes from the image data. The apparatus is also caused to cause, at least in part, a mapping of the one or more fogging attributes to one or more features of at least one classifier, wherein the at least one classifier is trained based, at least in part, on a co-registration of the one or more features to one or more records of previously made image judgements. The apparatus is further caused to cause, at least in part, a classification of the at least one image as either in a fogging-afflicted state or a non-fogging-afflicted state based, at least in part, on the at least one classifier.

According to another embodiment, a computer-readable storage medium carries one or more sequences of one or more instructions which, when executed by one or more processors, cause, at least in part, an apparatus to process and/or facilitate a processing of image data associated with at least one image to cause, at least in part, an extraction of one or more fogging attributes from the image data. The apparatus is also caused to cause, at least in part, a mapping of the one or more fogging attributes to one or more features of at least one classifier, wherein the at least one classifier is trained based, at least in part, on a co-registration of the one or more features to one or more records of previously made image judgements. The apparatus is further caused to cause, at least in part, a classification of the at least one image as either in a fogging-afflicted state or a non-fogging-afflicted state based, at least in part, on the at least one classifier.

According to another embodiment, an apparatus comprises means for processing and/or facilitating a processing of image data associated with at least one image to cause, at least in part, an extraction of one or more fogging attributes from the image data. The apparatus also comprises means for causing, at least in part, a mapping of the one or more fogging attributes to one or more features of at least one classifier, wherein the at least one classifier is trained based, at least in part, on a co-registration of the one or more features to one or more records of previously made image judgements. The apparatus further comprises means for causing, at least in part, a classification of the at least one image as either in a fogging-afflicted state or a non-fogging-afflicted state based, at least in part, on the at least one classifier.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 is a flowchart of a process for determining color-based localized contrast features based, at least in part, on a Michelson contrast value, according to one example embodiment;

DESCRIPTION OF SOME EMBODIMENTS

Examples of a method, apparatus, and computer program for automated classification of an image based on the fogging attributes associated with the image are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to automated classification of images based on fogging attributes, it is contemplated that the approach described herein may be applicable to any other condition or feature that can potentially affect or degrade image quality. For example, the embodiments described herein can be practiced with any opacity attribute (e.g., lens flaring, temporary obstructions, etc.) that can interfere or obscure an image or portion of an image in place of the fogging attribute.

Figure 1:
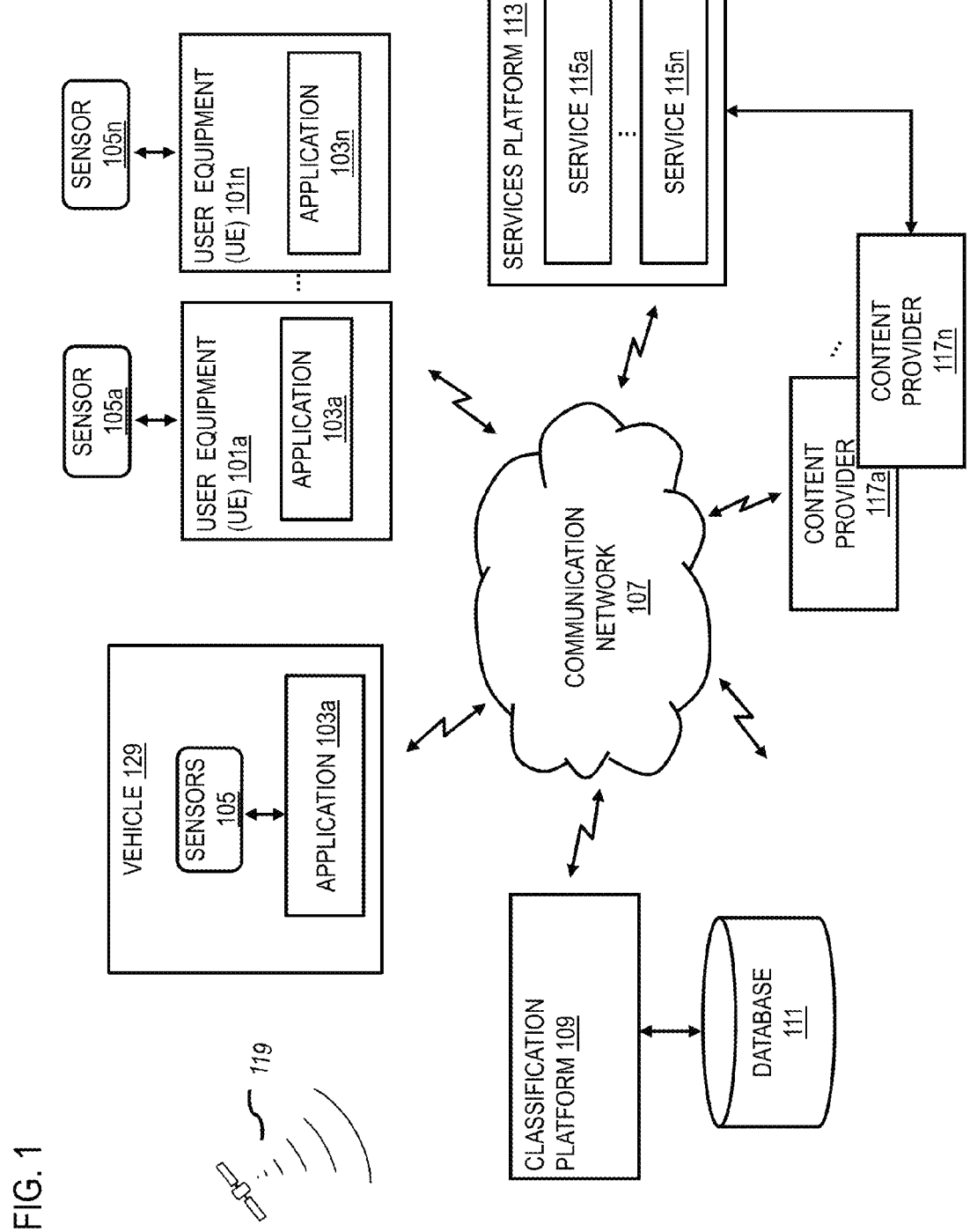
FIG. 1 is a diagram of a system capable of causing automated classification of an image based on the fogging attributes associated with the image, according to one example embodiment.

FIG. 1 is a diagram of a system capable of causing automated classification of an image based on the fogging attributes associated with the image, according to one embodiment. As previously discussed, one area of interest among service providers and device manufacturers has been accurate and efficient classification of images based on their fogging attributes. Service providers offer high-resolution image content featuring true street view perspectives and satellite data to consumers and enterprise customers. The captured images find applications in route planning, asset maintenance, automated driving, and so on. However, fogging/haze is the one of the biggest quality issues during data capture process. For example, fogging/haze could manifest due to the internal factors like moisture present in the lens, in which case it is localized around the center of the image. Another cause of the affliction is the external environmental conditions like water or smoke particle suspensions in the atmosphere. Given that it partially or fully occludes the image, it is a serious issue and affects feature recognition. Quality control of the captured images is integral to providing best customer experience. With respect to quality of an image, human vision and intellect is capable of scrutinizing various characteristics in the image, for instance, levels of fogging, level of haze, color balance/saturation, blurriness, presence and types of objects in the image, or the like characteristics. Hence, some content and service providers employ dedicated quality assurance teams that are assigned with the task of manually examining the fogging attributes in the images. However, due to time and human resource constraints, only a limited number of images may be examined, thereby allowing the use of poor quality images. In addition, the existing techniques addresses the issues of removing fog/haze from an image by assuming that the fog is already present in the image. They do not address the problem encountered during categorization of images, specifically, whether an image is normal or afflicted with fog/haze. Further, the existing approaches do not incorporate human subjective judgments during prediction of image quality.

To address this problem, a system 100 of FIG. 1 introduces the capability for automatic prediction of partial or full affliction of fog in at least one image using the knowledge from database co-registered with judgments from image quality experts. System 100 learns a probabilistic classifier by making use of color based localized contrast features. Such automated machine-based approach to fogging assessment may reduce human involvement and could provide quality information for every single capture. Since, system 100 is trained based on human expert's judgments, it learns what the quality experts judge as fogging vis-à-vis no fogging. The system 100 computes attributes relating to color based localized Michelson contrast in the at least one image. Then, the system 100 causes a mapping of the attributes of the at least one image to quality experts' judgments on such attributes. In another embodiment, the system 100 implements a method wherein multiple bounding boxes are centered on the middle of the at least one image to detect multiple images (e.g., images partially or fully afflicted with fog/haze). The middle region of an image is chosen because the fog starts to manifest from the center of the lens.

In one scenario, the system 100 may utilize one or more machine learning algorithms for automated classification of an image based on the fogging attributes associated with the image by using a database including subjective level fogging attributes judgements/scores on various images by human experts. The algorithm may analyze or compute attributes relating to fog, haze, shadows, dark and bright pixel percentages, or a combination thereof in at least one image. Then, the attributes may be mapped to the subjective judgments input by the experts. In one embodiment, the system 100 may extract fogging sensitive attributes from at least one image, and the classifier algorithm can map those attributes to human judged fogging level categories. For example, a probabilistic support vector machine based classification algorithm/function may be utilized, however, other classifier mechanisms may be used as well.

In one embodiment, the system 100 may cause a comparison of the fogging attributes for one or more images with one or more categorized images. In one example embodiment, a fogging attribute may be based on the fogging level (e.g., a score or a percentage) associated with the region of interest in the at least one image, which may be compared to a threshold value (e.g., in a database) for determining a level (e.g., minimum, medium, severe, etc.) of the fogging attribute. Further, a fogging score, level, or similar indicators may be compared to subjective level judgements/scores/categories that are provided by human experts. For example, a certain fogging score for a region of interest in an image may be compared to a fogging category given by an expert for another region of interest in another image.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a classification platform 109 via a communication network 107, e.g., a wireless communication network. In one embodiment, the classification platform 109 performs one or more functions associated with automated analysis and classification of an image based on the fogging attributes associated with the image.

As shown in FIG. 1, the system 100 comprises of UE 101. In one embodiment, the UE 101 may include, but is not restricted to, any type of a mobile terminal, wireless terminal, fixed terminal, or portable terminal. Examples of the UE 101, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In one embodiment, the UE 101 may support any type of interface for supporting the presentment of one or more recommended routes towards at least one destination. In addition, the UE 101 may facilitate various input means for receiving and generating information, including, but not restricted to, a touch screen capability, a keyboard and keypad data entry, a voice-based input mechanism, and the like. Any known and future implementations of the UE 101 may also be applicable. In one embodiment, the UE 101 may be included, embedded within, or communicatively connected to the one or more vehicles (e.g., vehicle 129). In one embodiment, the at least one or more vehicles 129 includes at least one autonomous vehicle, at least one highly-assisted driving vehicle, or a combination thereof. In one example embodiment, the vehicle 129 may use sensors 105 (e.g., cameras) and/or application 103 to capture and analyze images, for example, identifying whether a traffic signal is red/yellow/green, identifying road signs, and other features. The classification platform 109 may determine fogging attributes in the one or more captured images by the vehicle 129 based, at least in part, on a determination that the image is not accurately portraying the traffic signal and/or road signs due to external haze/fog or internal camera fog.

The UE 101 may further include applications 103. Further, the applications 103 may include various applications such as, but not restricted to, location-based service application, navigation application, content provisioning application, camera/imaging application, mapping application, sensor monitoring applications, media player application, social networking application, calendar applications, multimedia application, and the like. In one embodiment, the applications 103 are installed within the UE 101. In one example embodiment, the camera/imaging application installed in the UE 101 and/or on-board a vehicle 129 may capture one or more images and provide the captured images to the classification platform 109. In another example embodiment, a location-based service application installed in the UE 101 enables geotagging of one or more images (e.g., capturing GPS information at the time a picture is taken), as a result the classification platform 109 may determine, for example, location information for one or more images. In one scenario, at least one captured image may include or be associated with metadata providing information about a geo-location where the image was captured, date, time, type of equipment used for the capture, or the like information, which may be provided by a content/service provider.

The system 100 also includes one or more sensors 105, which can be implemented, embedded or connected to the UE 101 and/or vehicle 129. The sensors 105 may be any type of sensor. In certain embodiments, the sensors 105 may include, for example, but not restricted to, a global positioning sensor for gathering location data, such as a Global Navigation Satellite System (GNSS) sensor, Light Detection And Ranging (LIDAR) for gathering distance data, a network detection sensor for detecting wireless signals or receivers for different short-range communications (e.g., Bluetooth, Wi-Fi, Li-Fi, Near Field Communication (NFC) etc.), temporal information sensors, a camera/imaging sensor for gathering image data (e.g., the camera sensors may automatically capture images of various location for analysis purpose), and the like. In one example embodiment, the LIDAR sensors may use one or more lasers to collect data points representing on-ground objects in a surrounding area. The LIDAR sensors may collect and gather data points in a point cloud, such as a three dimensional point cloud, in which each data point corresponds to a local coordinate, such as (x, y, z). In one scenario, LIDAR sensors not only collect street level (i.e., outdoor) 3D point clouds, but also indoor three dimensional point clouds. In another embodiment, the sensors 105 may include light sensors, oriental sensors augmented with height sensor and acceleration sensor (e.g., an accelerometer can measure acceleration and can be used to determine orientation of the UE 101), tilt sensors, e.g., gyroscopes, to detect the degree of incline or decline of the vehicle along a path of travel, an electronic compass to detect a compass direction, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors 105 may detect weather data, road condition, traffic information, or a combination thereof. In one example embodiment, the UE 101 may include Global Positioning System (GPS) receivers to obtain geographic coordinates from satellites 119 for determining current location and time associated with the UE 101. Further, the location can be determined by an Assisted Global Positioning (A-GPS), Cell of Origin, a wireless signal triangulation system, or other location extrapolation technologies.

Further, various elements of the system 100 may communicate with each other through a communication network 107. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), vehicle controller area network (CAN bus), and the like, or any combination thereof.

In one embodiment, the classification platform 109 may be a platform with multiple interconnected components. The classification platform 109 may include one or more servers, intelligent networking devices, computing devices, components and corresponding software for automated classification of an image based on the fogging attributes associated with the image. In addition, it is noted that the classification platform 109 may be a separate entity of the system 100, a part of the one or more services 115a-115n (collectively referred to as services 115) of the services platform 113, or the UE 101.

In one embodiment, the classification platform 109 may process and/or facilitate a processing of image data associated with at least one image to cause, at least in part, an extraction of one or more fogging attributes from the image data. In one scenario, fogging may manifest in an image due to the internal factors like moisture present in the lens and/or external factors like environmental conditions. The size of the affected area depends on the amount of moisture. The classification platform 109 may extract fogging-sensitive attributes from the image.

In another embodiment, the classification platform 109 may cause, at least in part, a mapping of the one or more fogging attributes to one or more features of at least one classifier. In one scenario, the classification platform 109 may map the fogging attributes of the one or more images to the human expert judged fogging and normal categories. In another scenario, the classification platform 109 may use a probabilistic support vector machine based classification function, but other classifier machines can be implemented as well.

In a further embodiment, the classification platform 109 may cause, at least in part, a classification of the at least one image as either in a fogging-afflicted state or a non-fogging-afflicted state based, at least in part, on the at least one classifier. In one scenario, the classification platform 109 may learn to predict a partial or full affliction of fog/haze in an image using the knowledge from database of true terrestrial captures co-registered with judgments from image quality experts. In another scenario, the classification platform 109 may learn a probabilistic classifier by making use of color based localized contrast features. In a further scenario, the classification platform 109 may detect the fogging afflicted due to lens moisture or external particle suspension in the atmosphere.

In one embodiment, the database 111 may store and manage various content types, e.g., pictures, video, audio, related data, etc., associated with various geo-locations or points of interest (POIs). In one instance, the database 111 may include images and related data captured by the sensors 105, wherein the images and related data may be processed and/or made available to one or more entities of the system 100. For example, a camera sensor 105 may capture images along a driving route and deposit the images and any related data into the database 111. In various scenarios, one or more entities of the system 100 may have access to the database 111. The information stored may be any multiple types of information that can provide means for aiding in the content provisioning and sharing process. In one embodiment, the classification platform 109 may include or have access to the database 111 for accessing or storing any kind of media and associated data, such as classification information, one or more fogging attribute scores, one or more contextually relevant geo-location points, location proximity information, temporal information, contextual information, historical user information, etc. Media and data stored in the database 111 may, for instance, be provided by the UE 101, vehicle 129, one or more services platform 113, or one or more content providers 117a-117n (content provider 117). The database 111 may also include data about places, such as cities, towns, or other communities, and other geographic features, such as bodies of water, mountain ranges, buildings, etc. that may be associated with the media contents. The database 111 may be maintained by the content provider 117 and/or the services platform 113 (e.g., a map developer). In one instance, a map developer may collect media content and geographic data to generate and/or enhance the database 111. The data may be obtained from various sources, such as municipalities or respective geographic authorities. In addition, remote sensing, such as aerial or satellite photography, may be used.

The services platform 113 may include any type of service. By way of example, the services platform 113 may include mapping services/application, navigation services/application, camera/imaging application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, etc. In one embodiment, the services platform 113 may interact with the UE 101, the classification platform 109 and the content provider 117 to supplement or aid in the processing of the content information. In one embodiment, the services platform 113 may be implemented or embedded in the classification platform 109 or in its functions.

By way of example, the services 115 may be an online service that reflects interests and/or activities of users. The services 115 allow users to share contact information, location information, activities information, contextual information, historical user information and interests within their individual networks, and provides for data portability. The services 115 may additionally assist in providing the classification platform 109 with information on travel plans of at least one user, activity information of at least one user, user profile information, and a variety of additional information.

The content provider 117 may provide content to the UE 101, the vehicle 129, the classification platform 109, and the services 115 of the services platform 113. The content provided may be any type of content, such as, image content, textual content, audio content, video content, etc. In one embodiment, the content provider 117 may provide content that may supplement content of the database 111, applications 103, the sensors 105, or a combination thereof. In one embodiment, the content provider 117 may provide or supplement the mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, local map data, or any combination thereof. In one embodiment, the content provider 117 may also store content associated with the UE 101, the classification platform 109, and the services 115 of the services platform 113. In another embodiment, the content provider 117 may manage access to a central repository of data, and offer a consistent, standard interface to data, such as, a repository of attributes information for one or more images, and so on. Any known or still developing methods, techniques or processes for determining attributes information for at least one image may be employed by the classification platform 109.

By way of example, the UE 101, the classification platform 109 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
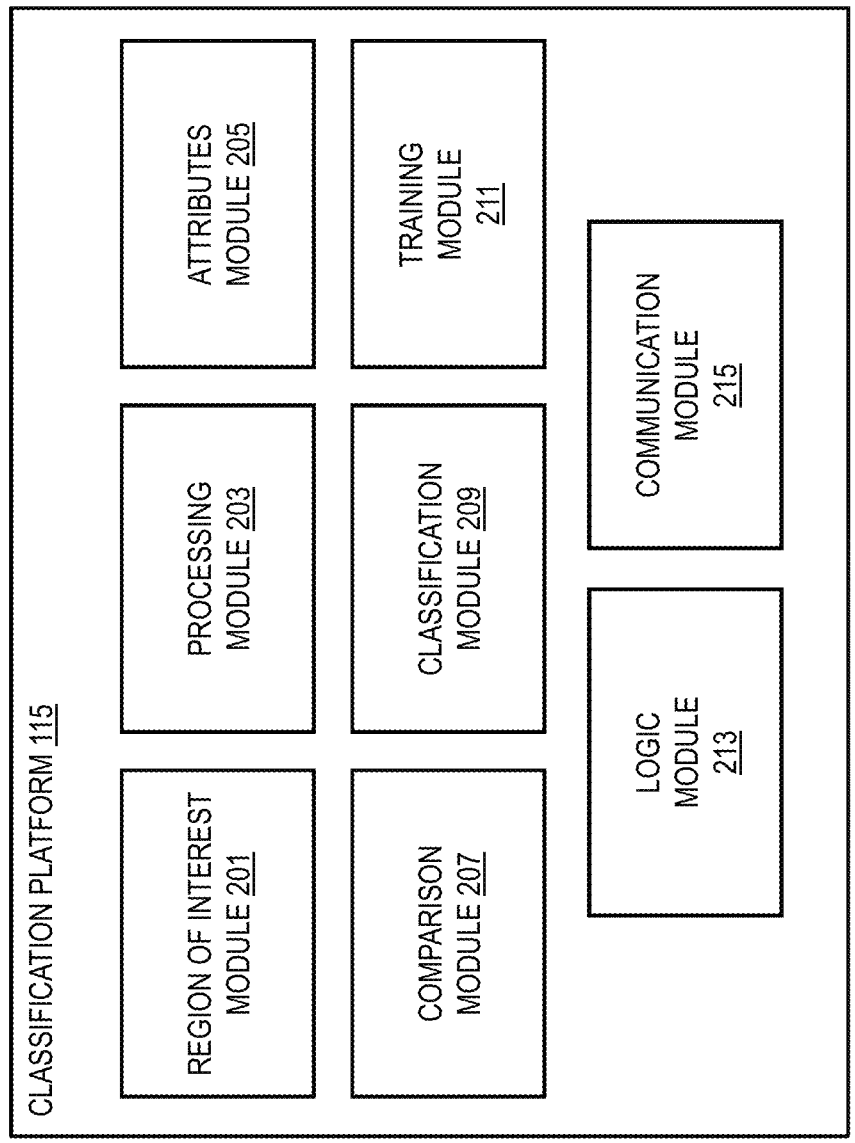
FIG. 2 is a diagram of the components of the classification platform 109, according to one example embodiment.

FIG. 2 is a diagram of the components of the classification platform 109, according to one example embodiment. By way of example, the classification platform 109 may include one or more components for classifying an image based on the fogging attributes associated with the image. In one embodiment, the classification platform 109 may include region of interest modules 201, processing modules 203, attributes modules 205, comparison modules 207, classification modules 209, training modules 211, logic modules 213, and communication modules 215. It is contemplated that the functions of these components may be combined in one or more components or performed by other components with similar functionalities.

In one embodiment, the region of interest module 201 may determine a region of interest associated with an image, wherein the region of interest may be a predetermined section/portion of the image. In one example, a region of interest may be based on various parameters associated with an image, for example, a type of an image, size of an image, geo-location of the image, objects or POIs present in the image, or other parameters. In one embodiment, the region of interest within an image may be the center region because the fog starts to manifest from the center of the lens. In another example embodiment, the region of interest within an image may include any regions with fog, haze, blur, etc.

In one embodiment, the processing module 203 may process image data associated with a region of interest of at least one image. Then, the processing module 203 may access database 111 to retrieve media content to determine fogging attributes for the at least one image. Then, based on one or more parameters associated with the image, the classification platform 109 may extract one or more fogging attributes from the image data.

In one embodiment, the attributes module 205 may process the output of the processing module 203 and/or utilize the processed image data to further determine the fogging attributes for the one or more images. In another embodiment, the attributes module 205 may process sensor information pertaining to environmental conditions as fogging attributes may occur due to environmental variables such as foggy, sunny, overcast, or the like conditions.

In one embodiment, the comparison module 207 may compare the one or more fogging attributes to one or more criteria. In one embodiment, a fogging attribute may be compared to subjective fogging level judgements/scores/categories that are provided by human users/inspectors/experts. In one example embodiment, a certain fogging level for a region of interest in an image may be compared to a fogging category given by users/inspectors/experts for another region of interest in another image.

In one embodiment, the classification module 209 may utilize one or more classifying algorithms (e.g., machine learning algorithms) to determine and generate one or more classifications for the image based, at least in part, on the comparison. In one embodiment, the one or more classifications include one or more scores associated with minimum fogging, moderate fogging, severe fogging, or a combination thereof. Also, the scores may be probability scores, for example, in the range of zero-to-one (0-1), for each of the classifications.

In one embodiment, the training module 211 may cause a training of one or more classification models based, at least in part, on the one or more classifications. In one instance, image data associated with classifications may be utilized to generate a database which may be utilized to train one or more classifying models/algorithms. Further, the training module 211 may update the classification module 209 with updated scores, information, etc. for use in the classification of one or more other images based on the one or more classification models. For example, a classification model used to classify an image may be utilized to classify one or more other images at the same or a different geo-location.

In one embodiment, the logic module 213 may manage tasks, including tasks performed by the other modules. For example, although the other modules may perform their actual tasks, the logic module 213 may determine when and how those tasks are performed or otherwise direct the other modules to perform the task. In one embodiment, the logic module 213 may determine to process image data of an image in substantially real-time, batch mode, according to a schedule, or a combination thereof. By way of example, the schedule may be based, at least in part, on computational resources, amount of available data, etc.

The communication module 215 may be used for communication between various elements of the system 100 as well as between modules, elements, components, etc. of the classification platform 109. For example, the communication module 215 may be used to communicate commands, requests, data, etc., to/from the classification platform 109, database 111, the content provider 117, or the like.

The above presented modules and components of the classification platform 109 can be implemented in hardware, firmware, software, or a combination thereof. Though depicted as a separate entity in FIG. 1, it is contemplated that the classification platform 109 may be implemented for direct operation by respective UE 101. As such, the classification platform 109 may generate direct signal inputs by way of the operating system of the UE 101 for interacting with the applications 103. In another embodiment, one or more of the modules 201-215 may be implemented for operation by respective UEs, as the classification platform 109, or combination thereof. Still further, the classification platform 109 may be integrated for direct operation with the services 115, such as in the form of a widget or applet, in accordance with an information and/or subscriber sharing arrangement. The various executions presented herein contemplate any and all arrangements and models.

Figure 3:
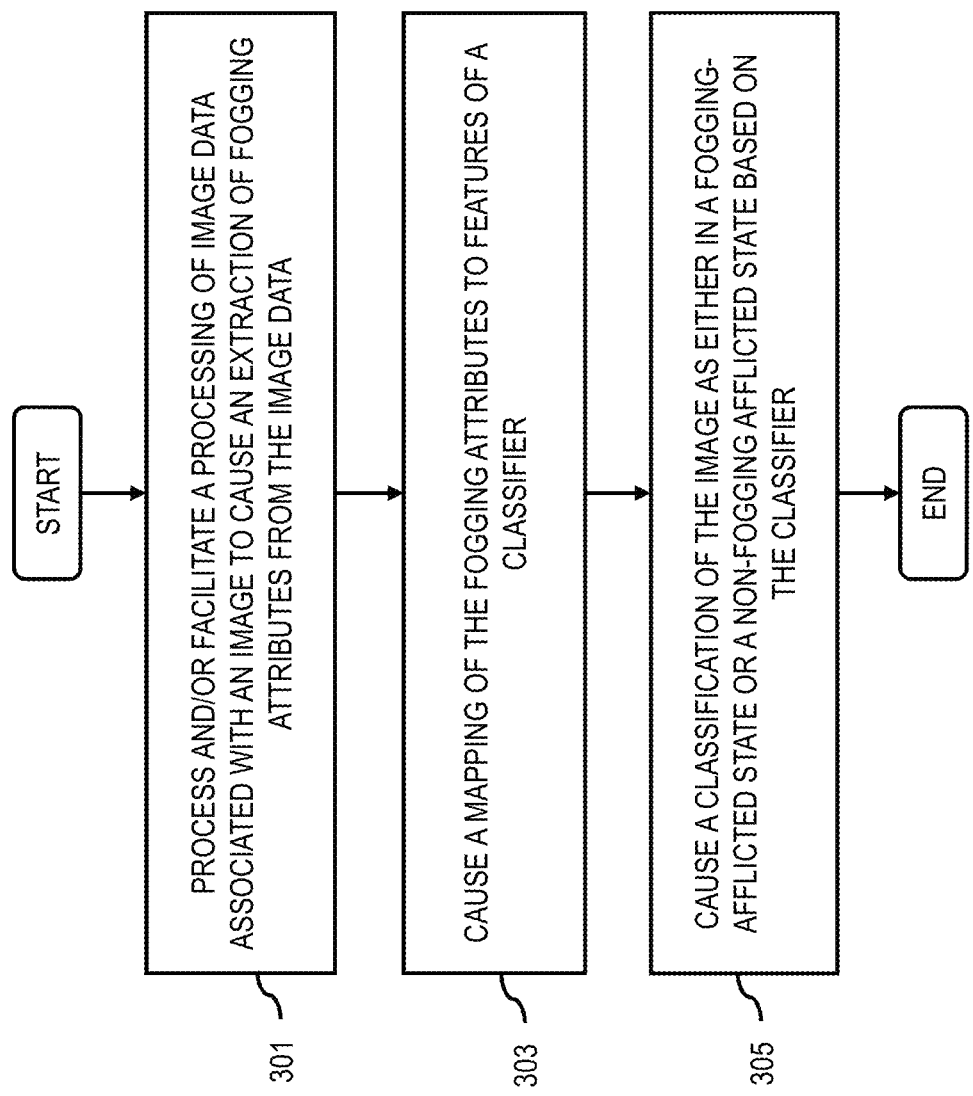
FIG. 3 is a flowchart of a process for automated classification of an image based on the fogging attributes associated with the image, according to one example embodiment.
Figure 9:
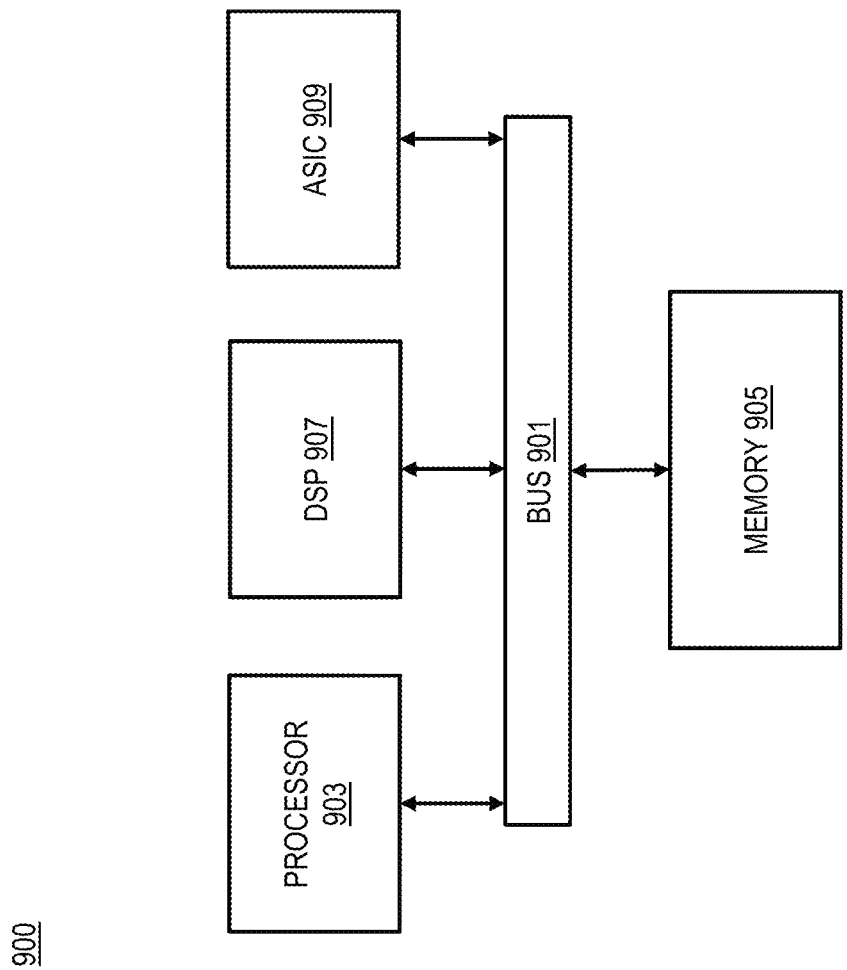
FIG. 9 is a diagram of a chip set that can be used to implement an embodiment of the invention.

FIG. 3 is a flowchart of a process for automated classification of an image based on the fogging attributes associated with the image, according to one example embodiment. In one embodiment, the classification platform 109 performs the process 300 and is implemented in, for instance, a chip set including a processor and a memory as shown in FIG. 9.

In step 301, the classification platform 109 may process and/or facilitate a processing of image data associated with at least one image to cause, at least in part, an extraction of one or more fogging attributes from the image data. In one scenario, the classification platform 109 may determine image data associated with a region of interest in at least one image. Then, the classification platform 109 may process the image data to determine fogging attributes associated with the region of interest. In one scenario, the classification platform 109 may detect fogging afflicted due to lens moisture or external particle suspension in the atmosphere. Subsequently, the classification platform 109 may cause an extraction of the fogging attributes from the at least one image.

In step 303, the classification platform 109 may cause, at least in part, a mapping of the one or more fogging attributes to one or more features of at least one classifier. In one embodiment, the at least one classifier is trained based, at least in part, on a co-registration of the one or more features to one or more records of previously made image judgements. In one embodiment, the one or more features of the at least one classifier include, at least in part, one or more color-based localized contrast features. In one example embodiment, the classification platform 109 may cause a mapping of the fogging attributes of at least one image to one or more expert judgments/scores, Michelson contrast value, or a combination thereof to cause a classification.

In step 305, the classification platform 109 may cause, at least in part, a classification of the at least one image as either in a fogging-afflicted state or a non-fogging-afflicted state based, at least in part, on the at least one classifier. In one embodiment, the fogging-afflicted state is associated with at least a fogging or a hazing at least one image, wherein the fogging or the hazing results from one or more conditions of at least one camera component used to capture the at least one image, one or more external conditions associated with at least one environment captured in the at least one image, or a combination thereof. In one example embodiment, the classification platform 109 may classify at least one image based, at least in part, on fogging level. The fogging level includes minimal fogging, moderate fogging, severe fogging, or a combination thereof. In another example embodiment, the classification platform 109 detects a partial, a full, or a combination thereof of fogging attributes in at least one image based, at least in part, on moisture present in the lens, environmental condition, or a combination thereof. Then, the classification platform 109 may cause a removal of the fogging attributes from the at least one image.

Figure 4:
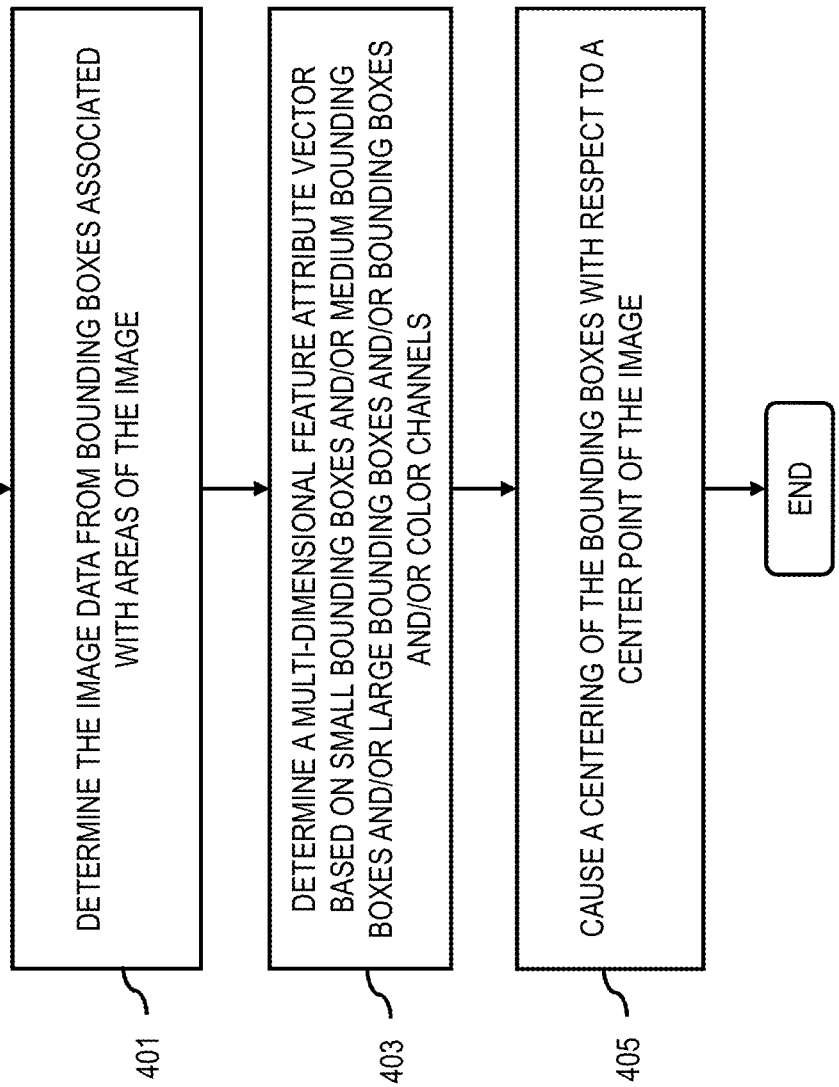
FIG. 4 is a flowchart of a process for determining image data and/or multi-dimensional feature attribute vector from one or more bounding boxes, according to one example embodiment.

FIG. 4 is a flowchart of a process for determining image data and/or multi-dimensional feature attribute vector from one or more bounding boxes, according to one example embodiment. In one embodiment, the classification platform 109 performs the process 400 and is implemented in, for instance, a chip set including a processor and a memory as shown in FIG. 9.

In step 401, the classification platform 109 may determine the image data from one or more bounding boxes associated with one or more areas of the at least one image. In one embodiment, the classification of the at least one image applies to the one or more areas of the at least one image. In another embodiment, the one or more bounding boxes include, at least in part, one or more small bounding boxes, one or more medium bounding boxes, one or more large bounding boxes specified for one or more color channels of the at least one image. In one embodiment, the classification platform 109 may cause an assignment of one or more bounding boxes to the region of interest of the at least one image. Then, the classification platform 109 may cause a calculation of contrast attributes for at least one pixel in at least one channel, wherein the at least one channel includes an RGB channel.

In step 403, the classification platform 109 may determine at least one multi-dimensional feature attribute vector based, at least in part, on the one or more small bounding boxes, the one or more medium bounding boxes, the one or more large bounding boxes, the one or more bounding boxes, the one or more color channels, or a combination thereof. In one embodiment, the mapping of the one or more fogging attributes to the one or more features of the at least one classifier, the classification of the at least one image, or a combination thereof is based, at least in part, on the at least one multi-dimensional feature attribute vector. In one example embodiment, the classification platform 109 may take 5×5 window around the pixel for the current implementation. This form of contrast quantifies how the range of intensities differs from the average value in the neighborhood. Since the pixels become more similar if the region is afflicted with fog, there is expectation of lower value of this quantity in those situations. In one example embodiment, to model the localization of the fog affliction, the classification platform 109 may compute the average value of contrast for small, medium and large bounding boxes, and for different color channels. Thereby providing with a nine dimensional feature attribute vector that can be used while learning the mapping to the fogging/normal classifications.

In step 405, the classification platform 109 may cause, at least in part, a centering of the one or more bounding boxes with respect to at least one center point of the at least one image. In one scenario, the region of interest includes center region of the at least one image since the fog starts to manifest from the center of the lens. The classification platform 109 may cause a localizing of the fogging attributes in the center of the at least one image based, at least in part, on a size, a degree, or a combination thereof of the fogging attributes.

FIG. 5 is a flowchart of a process for determining color-based localized contrast features based, at least in part, on a Michelson contrast value, according to one example embodiment. In one embodiment, the classification platform 109 performs the process 500 and is implemented in, for instance, a chip set including a processor and a memory as shown in FIG. 9.

In step 501, the classification platform 109 may determine the one or more color-based localized contrast features based, at least in part, on a Michelson contrast value. In one example embodiment, the classification platform 109 may compute features on multiple bounding boxes centered on the middle of an image since the fog starts to manifest from the center of the lens. The localization is necessary since the amount of internal/external moisture affects both the size and degree of affliction. For current implementation, three square shaped bounding boxes—small, medium and large may be centered around the middle of an image that capture 4%, 10%, 40% of the middle area respectively. Then, the classification platform 109 may compute the contrast attributes for each R, G, B channel. In one scenario, for every pixel in the channel, the classification platform 109 may compute the Michelson Contrast value, for example:

(Imax−Imin)/(Imax−Imin)

In one scenario, Imin and Imax are the minimum and maximum values of intensity in a local neighborhood of every pixel.

In step 503, the classification platform 109 may determine that the one or more color-based localized contrast features are associated with the fogging-afflicted state if the Michelson contrast value is below a threshold value. In one example embodiment, a Michelson contrast value below the threshold value may represent lowest luminance of the region of interest, thereby indicating a fogging-afflicted state for at least one image.

In step 505, the classification platform 109 may determine that the one or more color-based localized contrast features are associated with the non-fogging-afflicted state if the Michelson contrast value is above a threshold value. In one example embodiment, a Michelson contrast value above the threshold value may represent highest luminance of the region of interest, thereby indicating non-fogging-afflicted state for at least one image.

In step 507, the classification platform 109 may determine the Michelson contrast value for at least one pixel of the at least one image based, at least in part, on intensity information associated with one or more neighboring pixels. In one embodiment, the classification platform 109 may cause a calculation of Michelson contrast value for the at least one pixel in the at least one channel. Then, the classification platform 109 may determine minimum intensity values in a neighboring area of the at least one pixel. Subsequently, the classification platform 109 may map the Michelson contrast value to the user/expert scores. In another embodiment, the classification platform 109 may cause an assessment of one or more intensity values that differs from an average value in the neighboring area of the at least one pixel. Then, the classification platform 109 may cause an assignment of lower value to the at least one pixel based, at least in part, on a determination of similarities between the at least one pixel, at least one other pixel, or a combination thereof.

Figure 6:
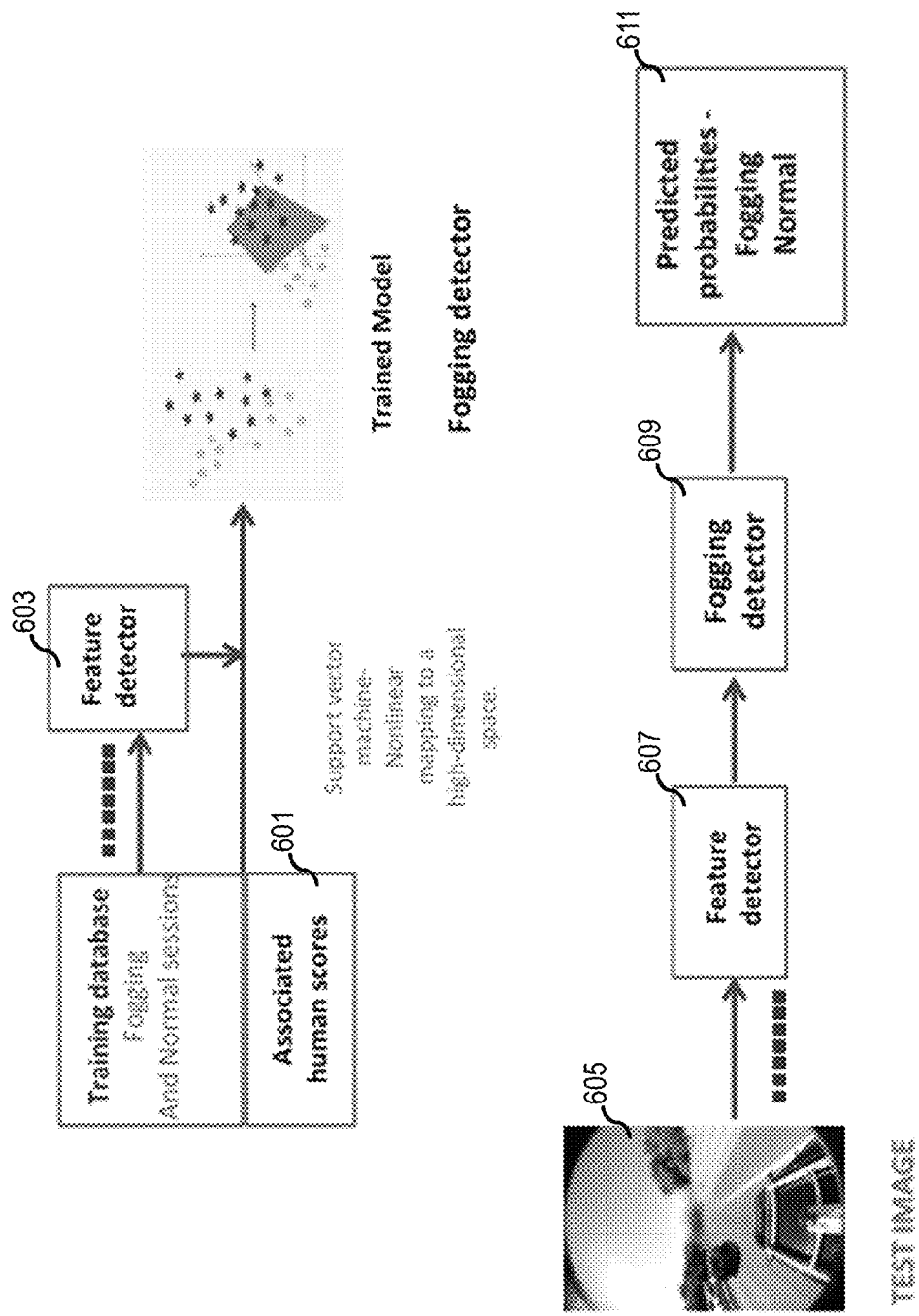
FIG. 6 is a diagram of a process for automated analysis and classification of one or more captured images, according to one example embodiment.

FIG. 6 is a diagram of a process for automated analysis and classification of one or more captured images, according to one example embodiment. In one scenario, one or more quality experts may observe one or more captured images to determine the fogging attributes. The quality experts may select a fogging level and/or score for the one or more images based, at least in part, on the determined fogging attributes, the size and area of bounding boxes in the one or more images, or a combination thereof (601). Such fogging level and/or score may be associated with the opacity level in the one or more captured images. Then, the one or more images may be categorized as being either in an obscure state (i.e., fogged images) or in a normal state (603). In another scenario, the classification platform 109 may compare the at least one test image 605 to the one or more observed and/or evaluated images to determine similar attributes, if any. The feature detector 607 and/or the fogging detector 609 may determine one or more attributes associated with the at least one test image 605, and match the attributes to the set of attributes determined by quality experts as having fog (611). The classification of the one or more test images 605 as fogged or normal is based, at least in part, on the similarity of the one or more attributes. In such manner, the algorithm learns to predict the partial or full affliction of fog/haze in an image using the knowledge from database of true terrestrial captures co-registered with judgments from image quality experts. The algorithm also learns a probabilistic classifier by making use of color based localized contrast features. In one example embodiment, the algorithm may take into consideration 10,000 fogged images and 6,000 normal images. Since, it is a learning based approach, the algorithm may divide the data such that 50% may be used for training and 50% for testing. To remove train-test bias, the algorithm may perform this experiment 100 times and report the average accuracy as a confusion matrix below:

|  | Predicted-Fogging | Predicted-Normal |
|---|---|---|
| Actual-Fogging | 87% | 13% |
| Actual-Normal | 16% | 84% |

Figure 7A:
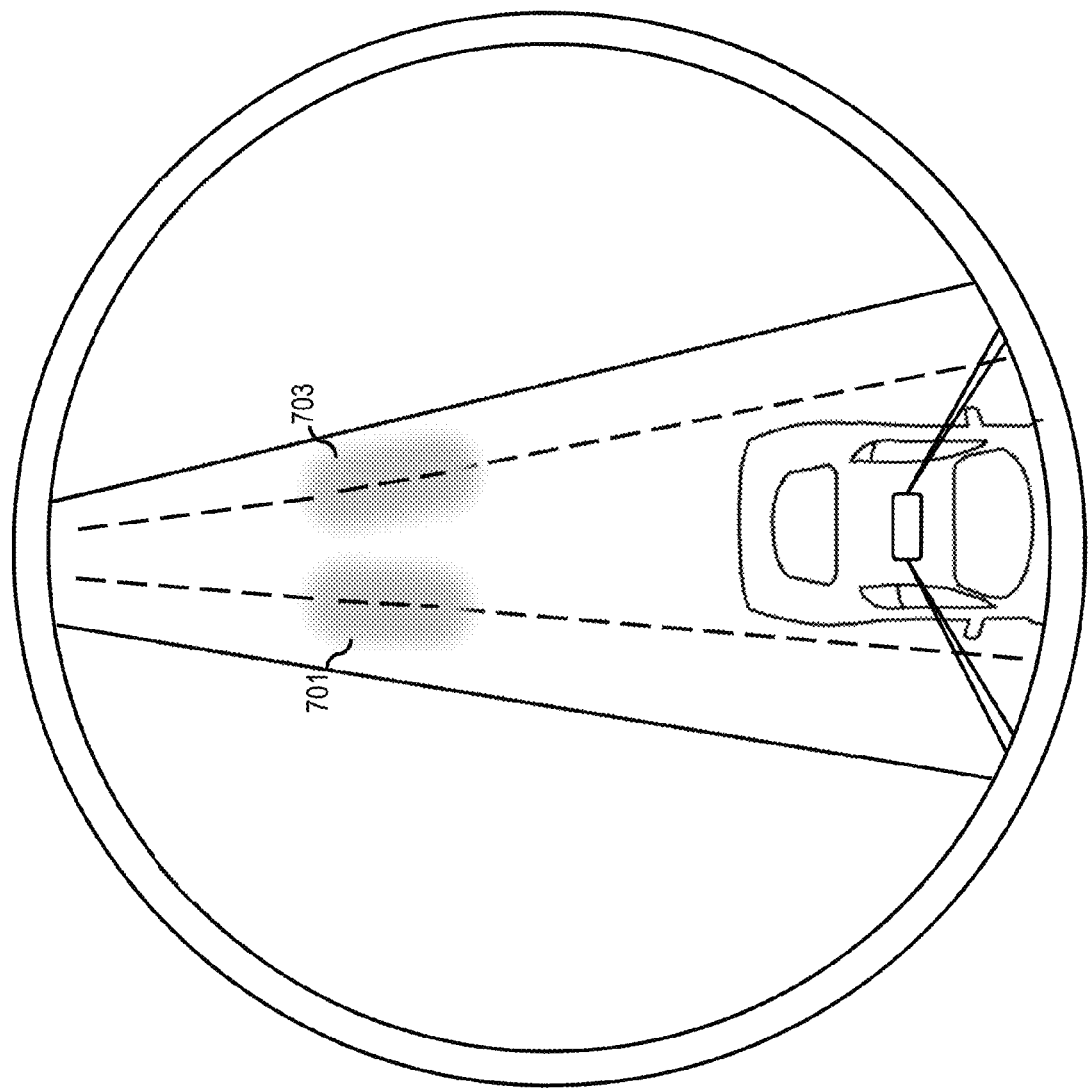
FIGS. 7 A-D are diagrams that represent different affected areas and level of fogging for at least one image, according to various example embodiments.
Figure 7B:
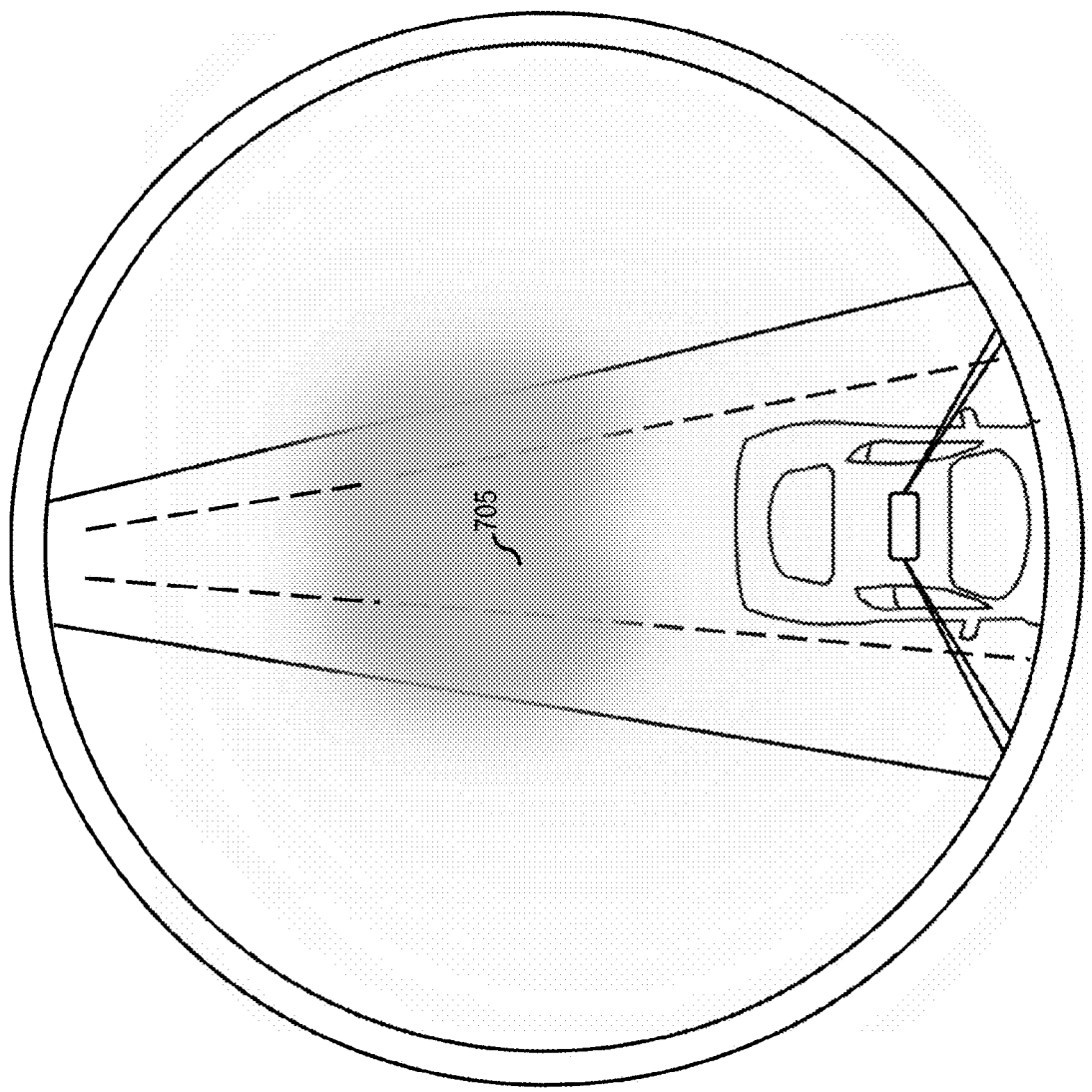
Figure 7C:
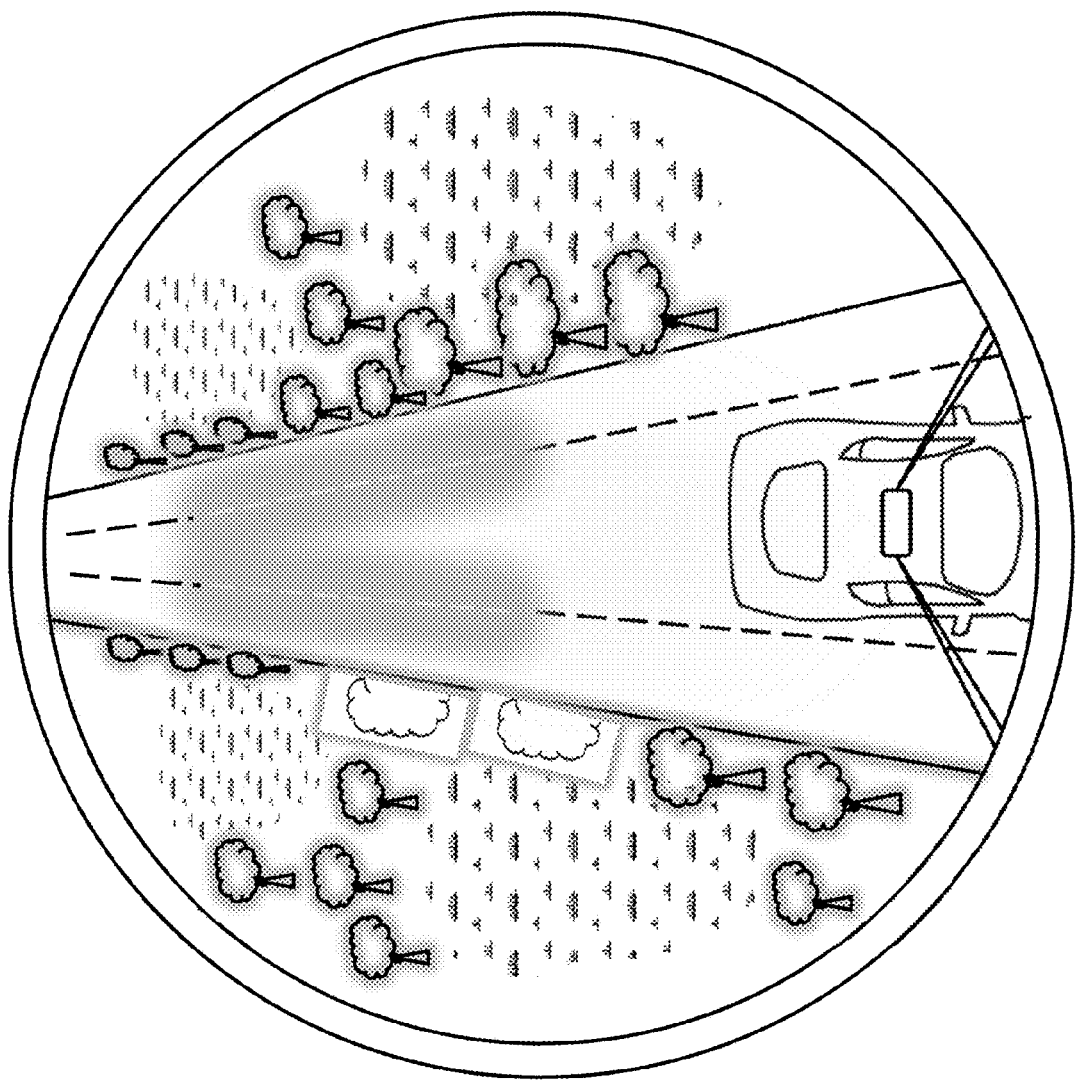
Figure 7D:
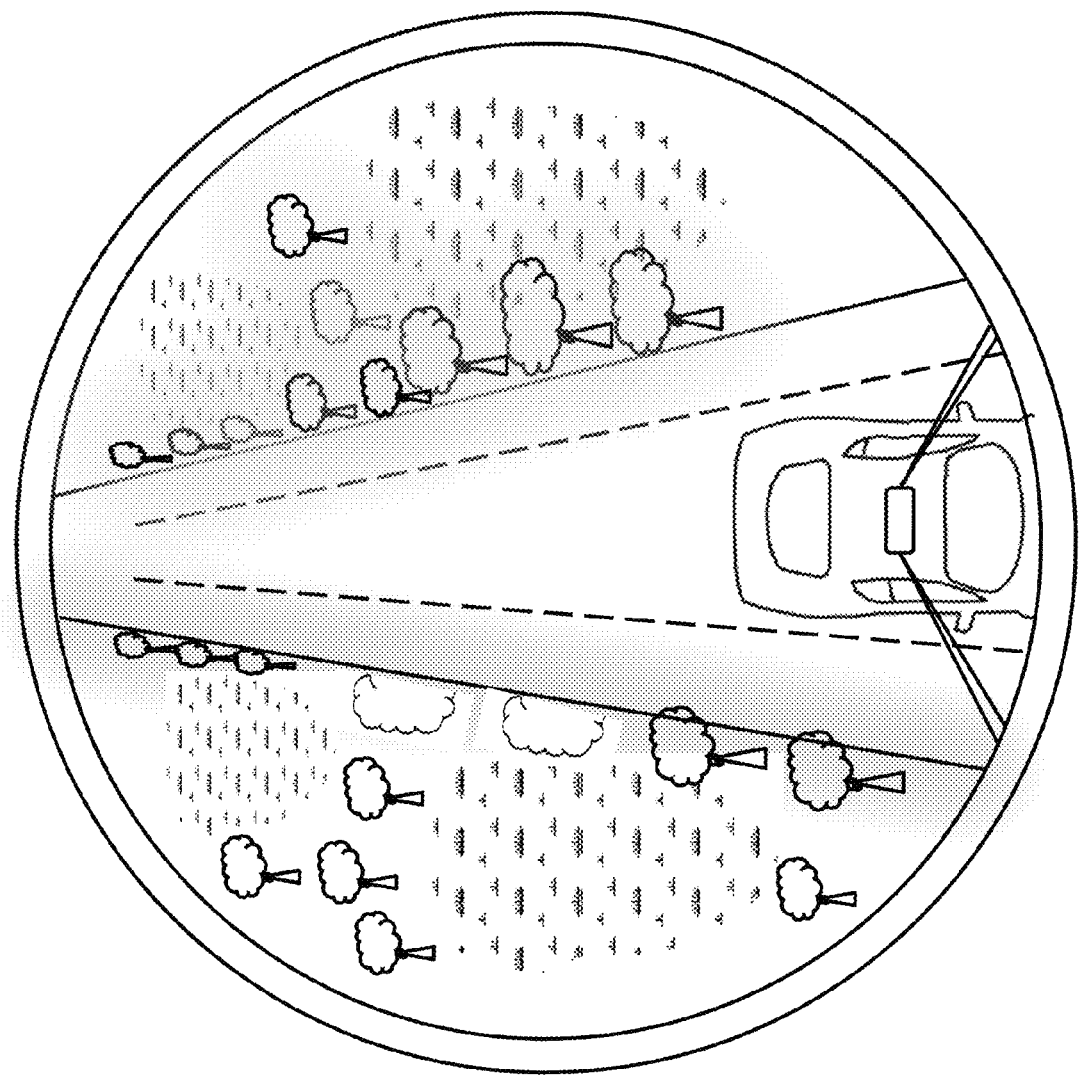

In some instances, service or content providers may utilize various methods (e.g., camera equipment on a vehicle) to capture images of geo-locations and points of interest (POIs), e.g., streets, buildings, open spaces, etc., that may be used by different applications or services. The fogging attributes of the images may vary as the images may have been captured at different times of a day (e.g., morning, afternoon, etc.), in different environmental conditions (e.g., foggy, sunny, cloudy, etc.), at different geo-locations (e.g., open space, near tall buildings/trees, etc.), by use of different equipment, or due to other factors. Some fogging attributes of an image may be based on the obscurity level, indicating blurriness, haziness, or to have similar effects. FIG. 7 A-D are diagrams that represent different affected areas and level of fogging for at least one image, according to various example embodiments. In one scenario, the classification platform 109 may cause a classification of at least one image based on the fogging level. The fogging level includes minimal fogging attributes, moderate fogging attributes, severe fogging attributes, or a combination thereof. In another scenario, the fogging attributes includes a fogging, a haze, or a combination thereof. In one example embodiment, FIG. 7A is a diagram that represents a scenario wherein a small area of an image (701, 703) is affected with minimal fogging. The size of the affected area in an image is based, at least in part, on the amount of moisture, environmental conditions, or a combination thereof. In another example embodiment, FIG. 7B is a diagram that represents a scenario wherein the small area 705 of an image is affected with severe fogging. As represented in FIGS. 7A and 7B, center region of an image is the region of interest, fogging manifests from the center region and spreads-out. On the other hand, FIGS. 7C and 7D represent external fogging. In one example embodiment, FIG. 7C is a diagram that represents a scenario wherein a large area of an image is affected with minimal level of opacity due to environmental conditions (e.g., foggy weather). In another example embodiment, FIG. 7D is a diagram that represents a scenario wherein a large area of an image is affected with moderate level of opacity due to environmental conditions (e.g., haze on the camera lens).

The processes described herein for automated classification of an image based on the fogging attributes associated with the image may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
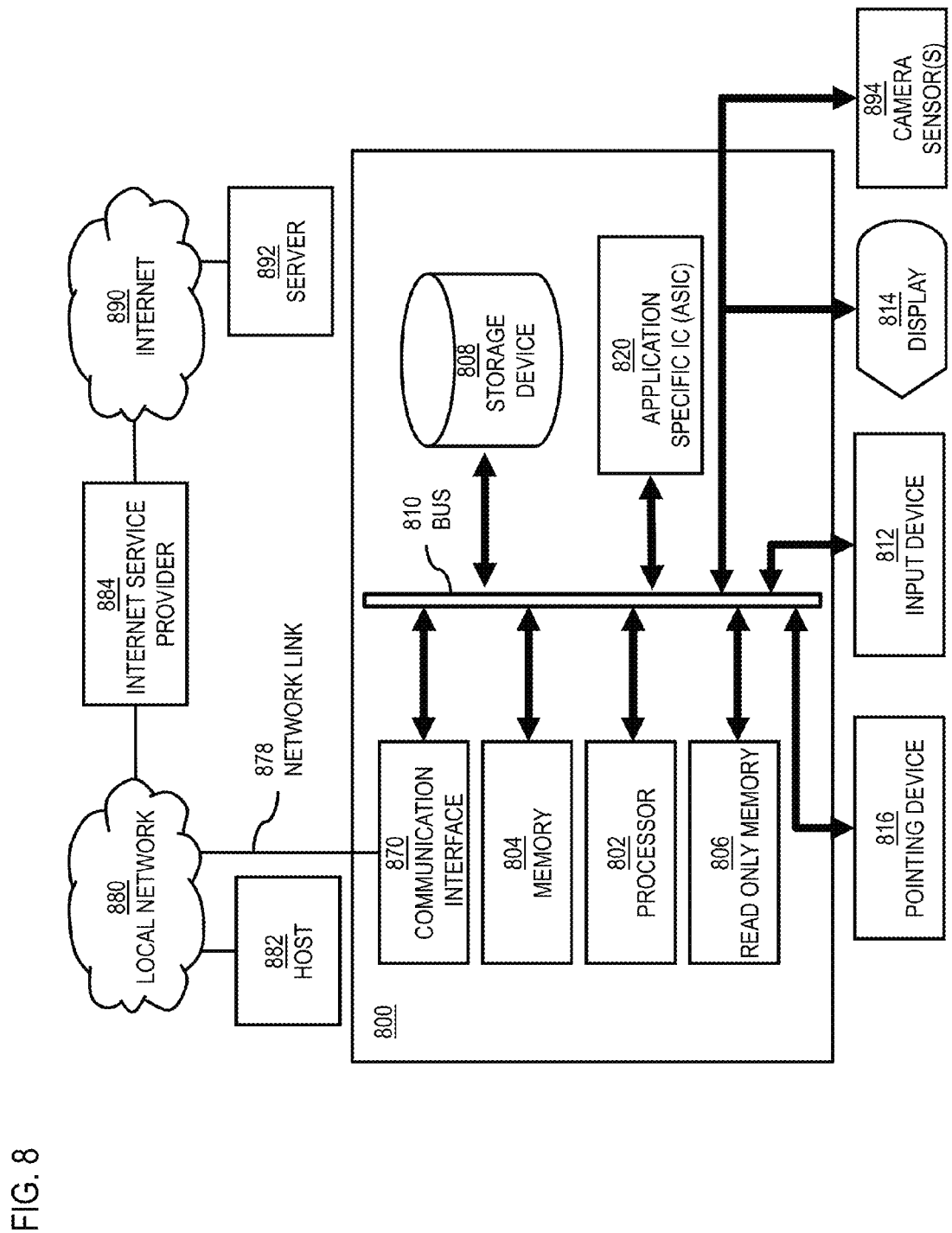
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to cause automated classification of an image based on the fogging attributes associated with the image as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of automated classification of an image based on the fogging attributes associated with the image.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to cause automated classification of an image based on the fogging attributes associated with the image. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for automated classification of an image based on the fogging attributes associated with the image. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for automated classification of an image based on the fogging attributes associated with the image, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 107 for automated classification of an image based on the fogging attributes associated with the image to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to cause automated classification of an image based on the fogging attributes associated with the image as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of automated classification of an image based on the fogging attributes associated with the image.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to cause automated classification of an image based on the fogging attributes associated with the image. The memory 905 also stores the data associated with or generated by the execution of the inventive steps.

Figure 10:
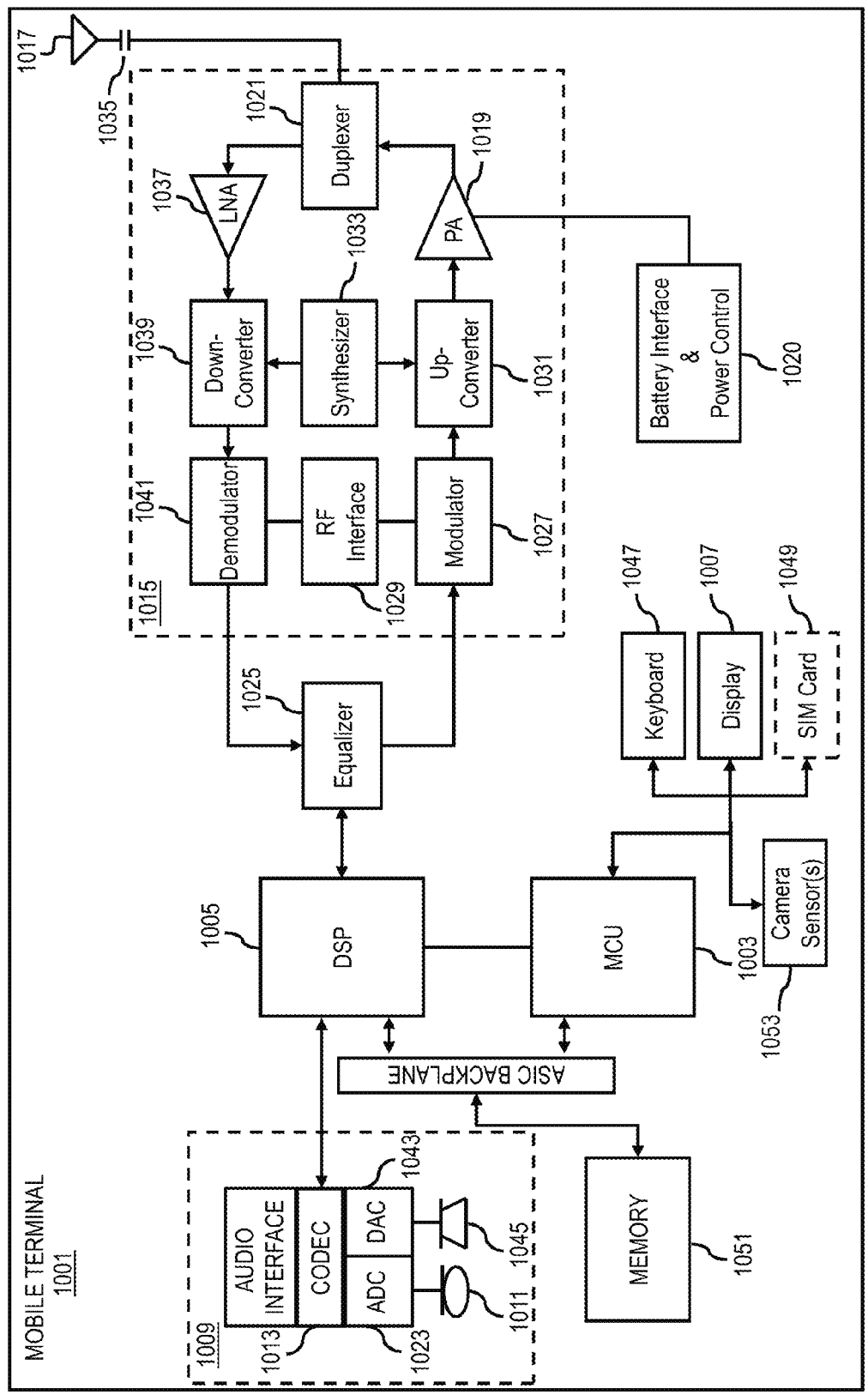
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of automated classification of an image based on the fogging attributes associated with the image. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of automated classification of an image based on the fogging attributes associated with the image. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to cause automated classification of an image based on the fogging attributes associated with the image. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1053 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by an apparatus, image data from a plurality of bounding boxes each centering at an identical point of an image, wherein the bounding boxes are of different sizes each smaller than a size of the image;
   initiating, by the apparatus, an extraction of one or more fogging attributes from the image data;
   initiating, by the apparatus, a mapping of the one or more fogging attributes to one or more features of at least one classifier, wherein the at least one classifier is trained based, at least in part, on a co-registration of the one or more features to one or more records of previously made image judgements; and
   initiating, by the apparatus, a classification of the image as either in a fogging-afflicted state or a non-fogging-afflicted state based, at least in part, on the at least one classifier.

2. A method of claim 1,
   wherein the bounding boxes are located within a center region of the image.

3. A method of claim 2, wherein the identical point of the image is the center point of the image, the bounding boxes include, at least in part, one or more small bounding boxes, one or more medium bounding boxes, and one or more large bounding boxes specified for a plurality of color channels of the image.

4. A method of claim 3, further comprising:
   determining at least one multi-dimensional contrast attribute vector based, at least in part, on the bounding boxes for every pixel in each of the color channels.

5. A method of claim 3, further comprising:
   computing an average value of contrast of pixels per bounding box for each of the one or more small bounding boxes, the one or more medium bounding boxes, and the one or more large bounding boxes in each of the color channels; and
   including the average value of contrast in the one or more fogging attributes.

6. A method of claim 1, wherein the one or more features of the at least one classifier include, at least in part, one or more color-based localized contrast features.

7. A method of claim 6, further comprising:
   determining the one or more color-based localized contrast features based, at least in part, on a Michelson contrast value.

8. A method of claim 7, further comprising:
   determining that the one or more color-based localized contrast features are associated with the fogging-afflicted state if the Michelson contrast value is below a threshold value; and
   determining that the one or more color-based localized contrast features are associated with the non-fogging-afflicted state if the Michelson contrast value is above a threshold value.

9. A method of claim 7, further comprising:
   determining the Michelson contrast value for at least one pixel of the image based, at least in part, on intensity information associated with one or more neighboring pixels.

10. A method of claim 1, further comprising:
    using one or more classifying algorithms to generate the at least one classifier based, at least in part, on comparing the one or more fogging attributes to one or more subjective fogging level judgements provided by human users,
    wherein the fogging-afflicted state is associated with at least a fogging or a hazing at least one image, wherein the fogging or the hazing results from one or more conditions of at least one camera component used to capture the image, one or more external conditions associated with at least one environment captured in the image, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
        determine image data from a plurality of bounding boxes each centering at an identical point of an image, wherein the bounding boxes are of different sizes each smaller than a size of the image;
        initiate an extraction of one or more fogging attributes from the image data;
        initiate a mapping of the one or more fogging attributes to one or more features of at least one classifier, wherein the at least one classifier is trained based, at least in part, on a co-registration of the one or more features to one or more records of previously made image judgements; and initiate a classification of the image as either in a fogging-afflicted state or a non-fogging-afflicted state based, at least in part, on the at least one classifier.

12. An apparatus of claim 11, wherein the bounding boxes are located within a center region of the image.

13. An apparatus of claim 12, wherein the identical point of the image is the center point of the image, the bounding boxes include, at least in part, one or more small bounding boxes, one or more medium bounding boxes, and one or more large bounding boxes specified for a plurality of color channels of the image.

14. An apparatus of claim 13, wherein the apparatus is further caused to:
determine at least one multi-dimensional contrast attribute vector based, at least in part, on the bounding boxes for every pixel in each of the color channels.

15. An apparatus of claim 12, wherein the apparatus is further caused to:
compute an average value of contrast of pixels per bounding box for each of the one or more small bounding boxes, the one or more medium bounding boxes, and the one or more large bounding boxes in each of the color channels; and
include the average value of contrast in the one or more fogging attributes.

16. An apparatus of claim 11, wherein the one or more features of the at least one classifier include, at least in part, one or more color-based localized contrast features.

17. An apparatus of claim 16, wherein the apparatus is further caused to:
determine the one or more color-based localized contrast features based, at least in part, on a Michelson contrast value.

18. A non-transitory computer-readable storage medium carrying one or more sequences of one or more instructions which, when executed by one or more processors, cause an apparatus to at least perform the following steps:
determining image data from a plurality of bounding boxes each centering at an identical point of an image, wherein the bounding boxes are of different sizes each smaller than a size of the image;
initiating an extraction of one or more fogging attributes from the image data;
initiating a mapping of the one or more fogging attributes to one or more features of at least one classifier, wherein the at least one classifier is trained based, at least in part, on a co-registration of the one or more features to one or more records of previously made image judgements; and
initiating a classification of the image as either in a fogging-afflicted state or a non-fogging-afflicted state based, at least in part, on the at least one classifier.

19. A non-transitory computer-readable storage medium of claim 18, wherein the bounding boxes are located within a center region of the image.

20. A non-transitory computer-readable storage medium of claim 19, wherein the identical point of the image is the center point of the image, the bounding boxes include, at least in part, one or more small bounding boxes, one or more medium bounding boxes, and one or more large bounding boxes specified for a plurality of color channels of the image.

* * * * *